United States Patent Office 3,749,561
Patented July 31, 1973

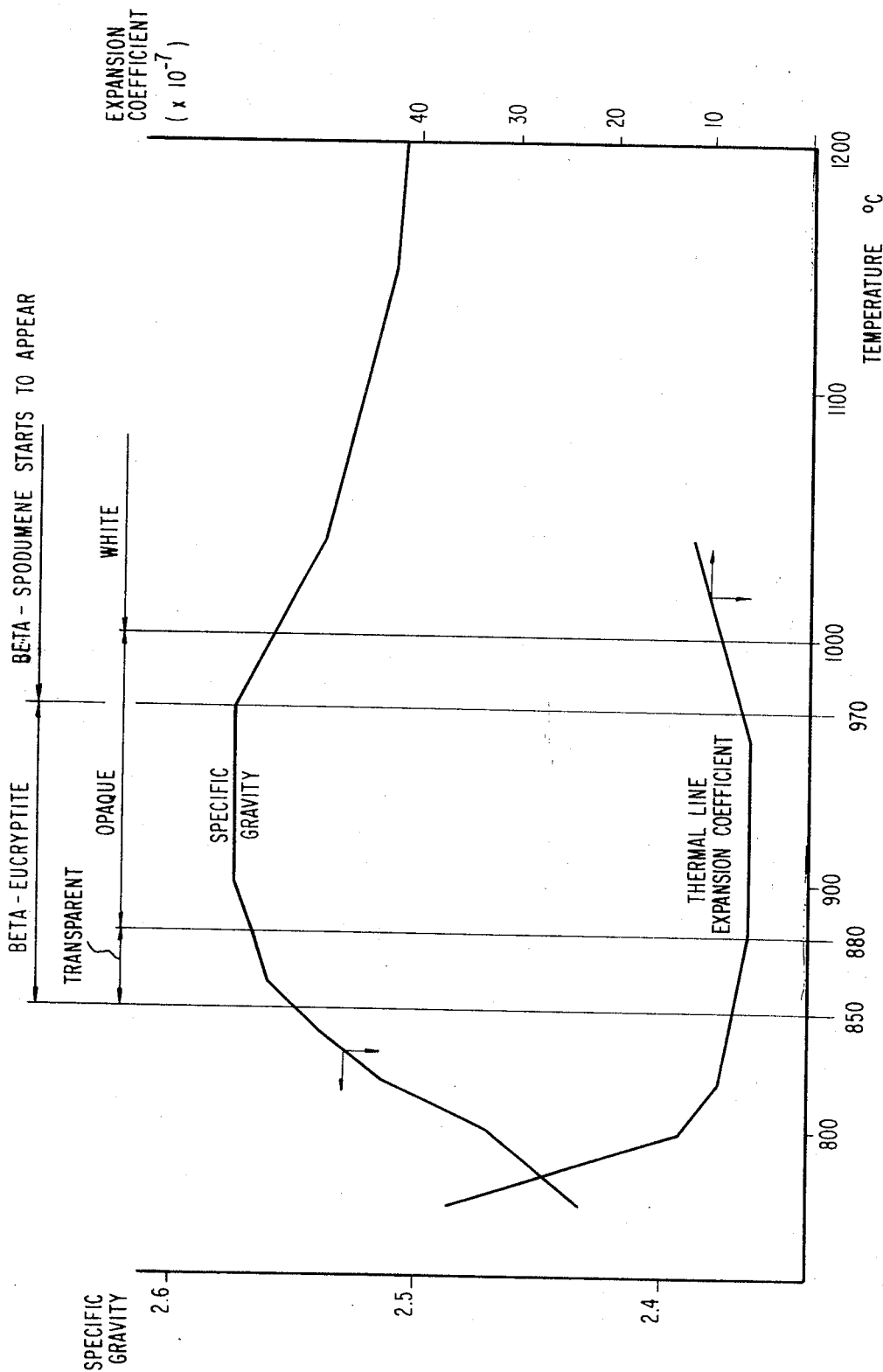

3,749,561
METHOD OF PRODUCING CRYSTALLINE GLASS CONTAINING PORTIONS HAVING DIFFERENT CRYSTALLIZATION EXTENTS
Shigeo Kuwayama, Kanagawa, Japan, assignor to Fuji Photo Film Co., Ltd., Ashigara-Kamigun, Kanagawa, Japan
Continuation-in-part of application Ser. No. 41,546, May 28, 1970. This application Mar. 23, 1972, Ser. No. 237,292
Claims priority, application Japan, May 29, 1969, 44/42,238
Int. Cl. C03b 29/00; C03c 15/00
U.S. Cl. 65—33       2 Claims

ABSTRACT OF THE DISCLOSURE

A method for producing a crystalline glass article of the $Li_2O-Al_2O_3-SiO_2$ system having glass portions of horizontally different crystalline extents which comprises subjecting a transparent crystalline glass to a further crystallizing treatment in the production of a crystalline glass, forcibly cooling a portion of said transparent crystalline glass during the heat treatment, the other portion of the transparent crystalline glass remaining uncooled whereby the portion remaining uncooled is with the difference between the specific gravity of the transparent crystalline glass portion and the opaque crystalline glass portion being less than 1.2% is disclosed.

CROSS-REFERENCE TO RELATED APPLICATIONS

This application is a continuation-in-part application of copending application Ser. No. 41,546 filed May 28, 1970 now abandoned.

BACKGROUND OF THE INVENTION

(1) Field of the invention

The present invention relates to a method of producing a crystalline glass article of the $Li_2O-Al_2O_3-SiO_2$ system having portions of different crystallization extents.

(2) Description of the prior art

Recently, the harmfulness of waste combustion gases has become an object of public concern and in such cases it is very important that a combustion chamber and a waste gas exhausting means of a combustion chamber be isolated to prevent the waste gases from diffusing into the atmosphere surrounding people from the standpoint of heat management as well as harmfulness of the waste gases. Hitherto, various attempts have been made to discharge the waste gases to the outside but with such attempts for discharging waste gases, a waste gas discharging passageway or a waste gas diffusion preventing wall is generally used. Hence, it becomes impossible in such case to observe directly the combustion flame in the combustion chamber.

In such cases, a viewing window is usually provided near the combustion zone of the combustion chamber for observing the combustion flame but such an attempt is accompanied with the disadvantage that the direction of observing combustion flame is limited to a narrow range.

Also, a combustion indicator or flame indicator has been known in which a combination of a transparent ceramic rod such as a glass rod, a quartz glass rod, or a crystalline glass rod and an oxidation resistant metal is used. The light emitted from the oxidation resistant metal heated red by the combustion flame is observed at any desired place through the transparent ceramic rod.

However, although such a combustion indicator or flame indicator may be effective in case where only the occurrence of combustion may be required to be observed, it sometimes happens, for example, in a gas range for cooking that temperature control is required and for such a purpose it is impossible to know the state of combustion in the gas range by the above-described type of the combustion indicator showing only the occurrence of combustion.

Moreover, a method has also been proposed in which a combination of a combustion indicator and a photoelectric element is used to catch the light from the combustion indicator by the photoelectric element, which acts, then, to control the valve of the gas burner. But, such a method uses a complicated mechanism and also it is difficult to know whether the inside condition of the combustion chamber is in perfect combustion or not.

In such case, if a white cover having a local transparent portion is employed as the cover for the gas range for cooking, not only can the state of combustion in the gas range be observed through the transparent portion but also the beautiful appearance of the gas range is not reduced since the inside of the gas range is not in sight due to the presence of the white cover.

The object of the present invention is to provide an improved crystalline glass capable of being used as the cover in, for instance, the above case.

SUMMARY OF THE INVENTION

A method for producing a crystalline glass article of the $Li_2O-Al_2O_3-SiO_2$ system having glass portions of horizontally different crystalline extents which comprises subjecting a transparent crystalline glass to a further crystallizing treatment in the production of a crystalline glass, forcibly cooling a portion of said transparent crystalline glass during the heat treatment, the other portion of the transparent crystalline glass remaining uncooled whereby the portion remaining uncooled is with the difference between the specific gravity of the transparent crystalline glass portion and the opaque crystalline glass portion being less than 1.2% is disclosed.

BRIEF DESCRIPTION OF THE ACCOMPANYING DRAWING

The accompanying drawing is a graphical presentation of the specific gravity changes and thermal line expansion coefficient changes with temperature for a $$Li_2O-Al_2O_3-SiO_3$$

system glass.,

DETAILED DESCRIPTION OF THE INVENTION

Many methods are already known for producing crystalline glasses and they can be generally summarized as follows: Namely, glass ingredients containing a nucleating agent are thoroughly mixed and then melted in a melting furnace by heating to vitrify the ingredients. The melt is molded in a manner, such as a press molding, blow molding, tube molding, and rolling, and the molding is then crystallized by heat-treating it again and thereafter cooling it.

In the present invention, the above-mentioned treatment of this invention is applied at the crystallization treatment. The forcible cooling treatment of this invention is applied before the start of the crystallization treatment, during the crystallization treatment, or up to a desired period during the crystallization treatment. Also, the forcible cooling treatment can be applied several times if desired.

The forcible cooling treatment which is the most specific feature of this invention can be conducted by bringing a cooling pipe close to the molding or bringing a cooling pipe into contact with the molding, or by blowing cold air onto the molding, whereby a crystalline glass having portions of different crystallized extent, which is the desired product of this invention, is obtained.

According to the present invention, a pattern-like transparent portion is locally formed at the cover of the white crystalline glass or other various effects can be provided in the white crystalline glass.

The invention has been described above with reference to examples of employing gas means but the invention is also applicable to electric heaters. For instance, when an electric heater, consisting of a tube of a transparent crystalline glass and a ribbon-like electric wire inserted in the tube, is used and the temperature of the electric wire is increased above about 800° C., crystallization proceeds at the contact points between the electric heating wire and the transparent crystalline glass tube, whereby these portions become opaque and then are broken. On the other hand, when the transparent crystalline glass tube is produced according to the present invention so that only the portions become white crystalline glass, the above-mentioned difficulty can be overcome.

The transparent crystalline glass used in this invention is of the $Li_2O-Al_2O_3-SiO_2$ system such as those which are disclosed in U.S. Pat 3,241,985. Illustrative compositions which can be used in this invention are as follows: (percent by weight)

$SiO_2$: 69.7%, $Al_2O_3$: 19.5%, $Li_2O$: 2.5%, $ZrO_2$: 1.9%, $TiO_2$: 1.7%, BaO: 0.8%, MgO: 1.7%, ZnO: 1.2%, $Na_2O$: 0.7%, $Sb_2O_3$: 0.4%, $As_2O_3$: 0.4%

A glass of the composition was heat-treated for two hours at various temperatures and the specific gravity and the thermal line expansion coefficient are as indicated in the figure.

From the drawing, it is clear that the specific gravity changes with the change of the heat-treating temperatures but that the terminal volume expansion coefficient calculated from the thermal line expansion coefficient hardly changes.

For example, when the transparent crystalline glass heat-treated at 850° C. was portionally heat treated at 900° C., the specific gravity of the glass heat-treated at 850° C. was 2.55, while that at 900° C. was 2.57, a 0.94% change. The thermal line expansion coefficient of the 850° C. heat-treated glass was $8 \times 10^{-7}$ cm./cm. ° C., while that of the 900° C. heat-treated glass was $6 \times 10^{-7}$ cm./cm. ° C., and the thermal volume expansion coefficient calculated from the thermal line expansion coefficient of the former was $24 \times 10^{-7}$ cm.$^3$/cm.$^3$ ° C., while that of the latter was $18 \times 10^{-7}$ cm.$^3$/cm.$^3$ ° C. When the glass was heated to for example, 600° C., the difference of the volume expansion between the two portions is $(24 \times 10^{-7}$ cm.$^3$/cm.$^3$ cc.$-18 \times 10^{-7}$ cm.$^3$/cm.$^3$ ° C.$) \times 600$° C.$\times 100 = 0.036$ (cm.$^3$/cm.$^3$)$=0.036\%$ and there is no effect due to thermal expansion.

The change of the specific gravity represents that of the volume. When a glass article is heat-treated at a different temperature in one portion and not in the remaining portion, a change of the volume occurs resulting in a strain. It was discovered that where the change of the specific gravity is 1.2% or less, such strain affecting the glass article does not occur. Based on this discovery, by the forcible cooling of a portion of the crystalline glass and by the control the difference between the of the specific gravity of the portion of the transparent crystalline glass and the portion of the opaque crystalline glass, strain in the glass article can be eliminated.

EXAMPLE I

Non-crystallized transparent crystalline flat glass was heat-treated for about two hours at 800–960° C. to render the entire glass body transparent and then while a disc-like water cooling member was brought close to or brought into contact with a desired portion, the remaining portions of the glass were maintained at temperatures of 970–1,050° C. for about 2 to 3 hours.

By these treatments, a white crystalline glass plate having a circular transparent portion was produced. By using the glass plate thus obtained as a cover for a gas heating means, the condition of the flame or combustion in the gas heating means can be directly observed, whereby a complicated control means becomes unnecessary. When a large number of small disc-like cooling members were used in the process mentioned above, a dotted transparent pattern was obtained on the white crystalline glass plate.

EXAMPLE II

A non-crystallized transparent crystalline glass plate was heat-treated for about 2 hours at 800–960° C. to render the entire glass transparent and while a ring-shaped cooling member is brought close to or brought into contact with the crystalline glass at a desired portion, the entire glass plate was maintained at temperatures of 970–1,050° C. for about 2 to 3 hours, whereby a white crystalline glass plate having a localized transparent ring-like portion was obtained.

When the crystalline glass plate was used as a cover for a gas heating means, the condition of the flame in it could be directly observed and hence the use of complicated control means became unnecessary. In this case, when a few ring-shaped cooling members were used, a decorative pattern was obtained.

EXAMPLE III

A non-crystallized transparent crystalline glass plate was heat-treated at 800–960° C. for about 2 hours to render the entire glass plate transparent and while a number of band-shaped cooling members were brought close to or brought into contact with the crystalline glass plate, the remaining portions were maintained at 970–1,010° C. for about 2 to 3 hours, whereby a crystalline glass plate having white and transparent stripped pattern was obtained. In this case, it is desirable to make the ends of the transparent bands white.

When the crystalline glass thus produced was used as a cover for a gas heating means, it became possible to observe directly the condition of the flame in it and the use of complicated control means became unnecessary. Furthermore, the transparent band can be only one.

EXAMPLE IV

A non-crystallized transparent crystalline glass pipe was heat-treated at 800–960° C. for about 2 hours to render the entire glass tube transparent and while two band-shaped water cooling members were brought into contact with or brought close to the outer surface of the glass tube along the longitudinal direction at the opposite sides thereof and the other portions were maintained at 970–1,010° C. for about 2 to 3 hours, whereby a crystalline transparent glass tube having white portions along the longitudinal direction at the opposite sides thereof was obtained. In this case, it is desirable to make the ends of the transparent portions white.

A ribbon-shaped electric wire was waved, and inserted in the glass tube so that the top and bottom portions of the waved ribbon were brought into contact with white portions of the glass tube. When the temperature of the electric wire was increased over 800° C., the crystalline glass was neither changed nor broken.

In the above-mentioned examples, the cooling treatment was conducted using a water cooling means, but an air cooling means can also be employed.

What is claimed is:

1. In a process of producing a crystalline glass article of the $Li_2O-Al_2O-SiO_2$ system which contains horizontal areas of transparent, crystalline glass and areas of opaque crystalline glass which are formed by thermally inducing secondary crystallization in the transparent crystalline glass article, the improvement which comprises: subjecting the transparent crystalline glass article uniformly to heat to cause the secondary crystallization while forcibly cooling the portion to remain transparent whereby the difference between the specific gravity of the portion of the transparent crystalline glass and the portion of the opaque crystalline glass is less than 1.2%.

2. The process of claim 1 wherein the subjecting of said glass article uniformly to heat comprises heating the article at 970 to 1,050° C. for about two to three hours while said portion of said article is cooled.

References Cited

UNITED STATES PATENTS

| | | | |
|---|---|---|---|
| 3,113,877 | 12/1963 | Janakirama-Rao | 65—33 X |
| 3,170,805 | 2/1965 | McMillan et al. | 65—33 X |
| 3,282,711 | 11/1966 | Lin | 65—33 X |
| 2,339,975 | 1/1944 | Blau | 65—33 X |
| 3,252,811 | 5/1966 | Beal | 65—33 X |
| 3,253,975 | 5/1966 | Olcutt | 65—33 X |
| 3,275,492 | 9/1966 | Herbert | 65—33 X |
| 3,298,553 | 1/1967 | Lusher | 65—33 X |
| 3,328,182 | 6/1967 | Araujo et al. | 65—33 X |
| 3,499,773 | 3/1970 | Petticrew et al. | 65—33 X |

OTHER REFERENCES

Handbook of Glass Manufacture, vol. II, pp. 192–199, Fay Tooley, 1960.

FRANK W. MIGA, Primary Examiner

U.S. Cl. X.R.

65—115, 30, 348